(12) United States Patent
Harman

(10) Patent No.: US 7,894,633 B1
(45) Date of Patent: Feb. 22, 2011

(54) IMAGE CONVERSION AND ENCODING TECHNIQUES

(75) Inventor: Philip Victor Harman, Scarborough (AU)

(73) Assignee: Dynamic Digital Depth Research Pty Ltd, Bentley, Western Australia (AU)

( * ) Notice: Subject to any disclaimer, the term of this patent is extended or adjusted under 35 U.S.C. 154(b) by 923 days.

(21) Appl. No.: 09/586,869

(22) Filed: Jun. 5, 2000

Related U.S. Application Data

(63) Continuation of application No. PCT/AU98/01005, filed on Dec. 3, 1998.

(30) Foreign Application Priority Data

| Dec. 5, 1997 | (AU) | PP0778 |
|---|---|---|
| Apr. 8, 1998 | (AU) | PP2865 |

(51) Int. Cl.
*G06K 9/00* (2006.01)
(52) U.S. Cl. .......................... 382/106; 382/154
(58) Field of Classification Search ................ 382/154, 382/180, 199, 203, 236, 241, 242, 243, 105; 348/26, 42, 51; 359/462; 356/2, 12, 601, 356/611; 345/419, 421, 422, 581, 582, 589; 352/57, 86
See application file for complete search history.

(56) References Cited

U.S. PATENT DOCUMENTS

| 3,772,465 A * | 11/1973 | Vlahos et al. ............... 382/167 |
| 3,805,238 A * | 4/1974 | Rothfjell ..................... 382/118 |
| 4,682,189 A * | 7/1987 | Purdy et al. ................. 345/468 |
| 4,783,829 A * | 11/1988 | Miyakawa et al. .......... 382/199 |
| 4,925,294 A * | 5/1990 | Geshwind et al. ............. 352/57 |
| 5,109,425 A * | 4/1992 | Lawton ....................... 382/107 |
| 5,130,815 A | 7/1992 | Silverman et al. |
| 5,202,928 A * | 4/1993 | Tomita et al. ............... 382/154 |
| 5,247,583 A * | 9/1993 | Kato et al. .................. 382/164 |
| 5,333,209 A * | 7/1994 | Sinden et al. ............... 382/187 |
| 5,469,535 A | 11/1995 | Jarvis et al. |
| 5,511,153 A * | 4/1996 | Azarbayejani et al. ...... 345/419 |
| 5,537,638 A | 7/1996 | Morita et al. |
| 5,546,461 A | 8/1996 | Ibaraki et al. |
| 5,640,468 A * | 6/1997 | Hsu ............................ 382/190 |
| 5,673,377 A * | 9/1997 | Berkaloff .................... 345/585 |
| 5,710,875 A * | 1/1998 | Harashima et al. .......... 345/419 |
| 5,793,900 A | 8/1998 | Nourbakhsh et al. |

(Continued)

FOREIGN PATENT DOCUMENTS

WO    WO 97/04404 A1    2/1997

(Continued)

OTHER PUBLICATIONS

NNRD41394 "Rendering Depth Maps." IBM Technical Disclosure Bulletin, vol. 41, No. 413, Sep. 1, 1998.*

(Continued)

*Primary Examiner*—John B Strege
(74) *Attorney, Agent, or Firm*—Banner & Witcoff, Ltd.

(57) ABSTRACT

A method of producing a depth map for use in the conversion of 2D images into stereoscopic images includes identifying at least one object within a 2D image; allocating an identifying tag to each object; allocating a depth tag to each object; and determining and defining an outline of each object.

18 Claims, 14 Drawing Sheets

U.S. PATENT DOCUMENTS

| | | | | |
|---|---|---|---|---|
| 5,798,762 | A | * | 8/1998 | Sfarti et al. ............... 345/420 |
| 5,974,175 | A | | 10/1999 | Suzuki |
| 6,016,158 | A | | 1/2000 | Mackinnon |
| 6,026,179 | A | | 2/2000 | Brett |
| 6,029,173 | A | * | 2/2000 | Meek et al. ............... 707/102 |
| 6,031,564 | A | * | 2/2000 | Ma et al. ................... 348/43 |
| 6,055,330 | A | * | 4/2000 | Eleftheriadis et al. ..... 382/154 |
| 6,167,167 | A | * | 12/2000 | Matsugu et al. ........... 382/283 |
| 6,181,815 | B1 | * | 1/2001 | Marugame ................ 382/154 |
| 6,219,048 | B1 | | 4/2001 | Miller et al. |
| 6,326,964 | B1 | * | 12/2001 | Snyder et al. ............. 345/419 |
| 6,370,262 | B1 | * | 4/2002 | Kawabata ................. 382/106 |
| 6,404,936 | B1 | * | 6/2002 | Katayama et al. ......... 382/283 |
| 6,504,569 | B1 | * | 1/2003 | Jasinschi et al. ........... 348/43 |

FOREIGN PATENT DOCUMENTS

| | | | |
|---|---|---|---|
| WO | WO 9724000 | A1 * | 7/1997 |
| WO | WO 0139125 | A1 * | 5/2001 |

OTHER PUBLICATIONS

"A Fast Linear Shape From Shading" by Tsai et al., Computer Vision and Pattern Recognition, 1992. Proceedings CVPR '92., 1992 IEEE Computer Society Conference on Publication Date: Jun. 15-18, 1992.*

Chiu et al. "Partial video sequence caching scheme for VOD systems with heterogeneous clients." 13th International Conference on Data Engineering, Apr. 7-11, 1997, pp. 323-332.

Harman, Phil. "Home based 3D entertainment—an overview." 2000 International Conference on Image Processing, Sep. 10-13, 2000, vol. 1, pp. 1-4.

* cited by examiner

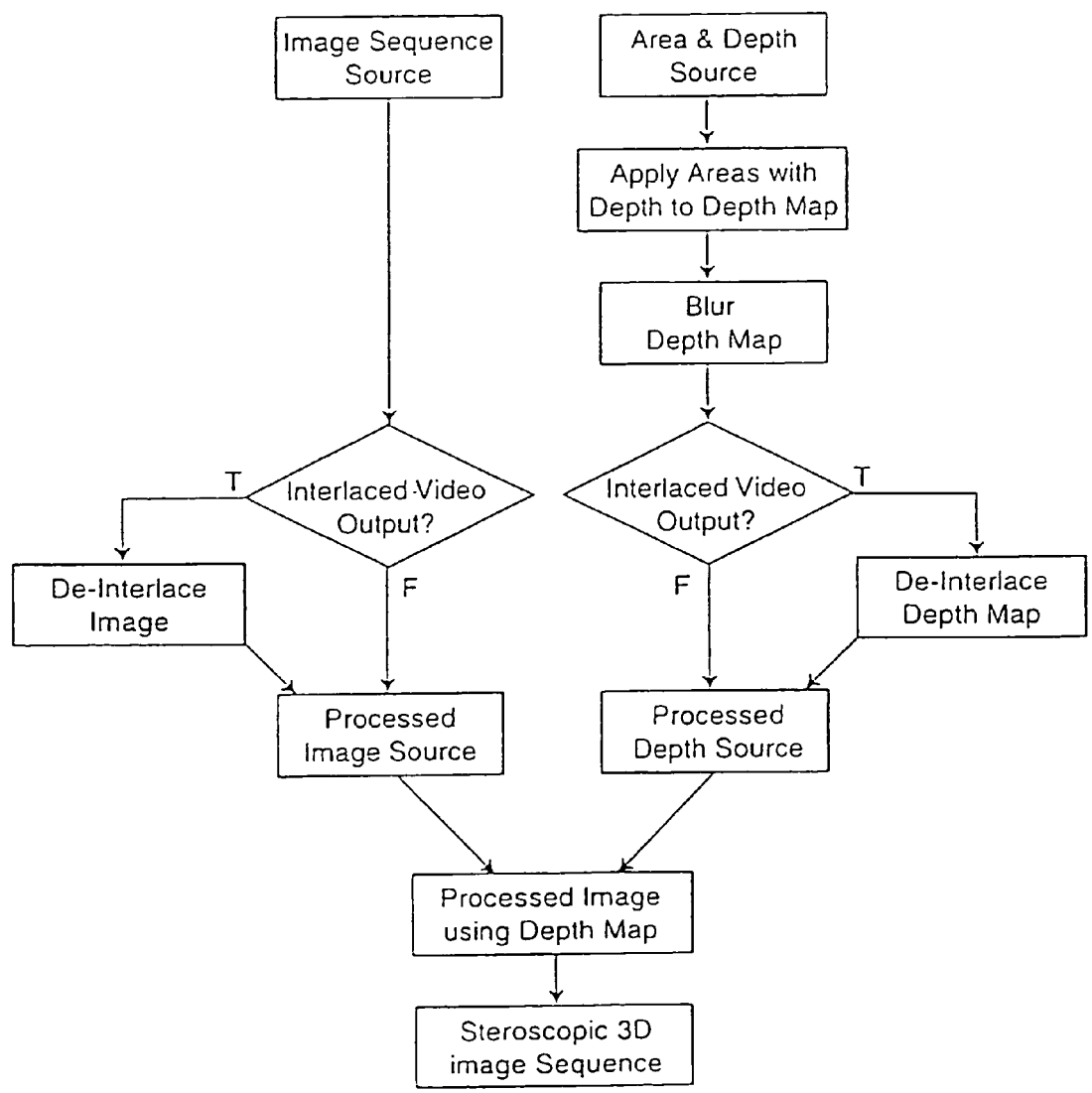

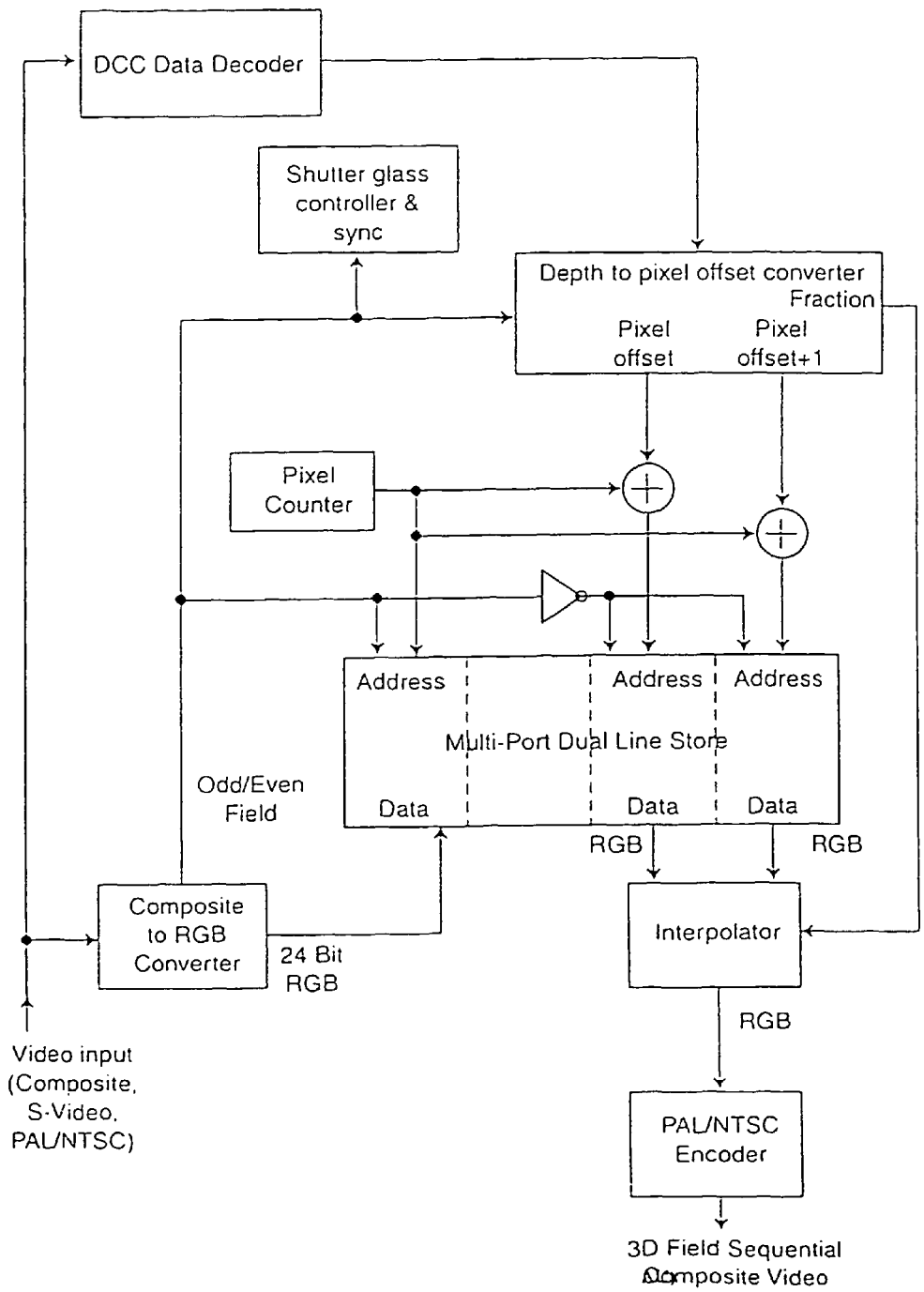

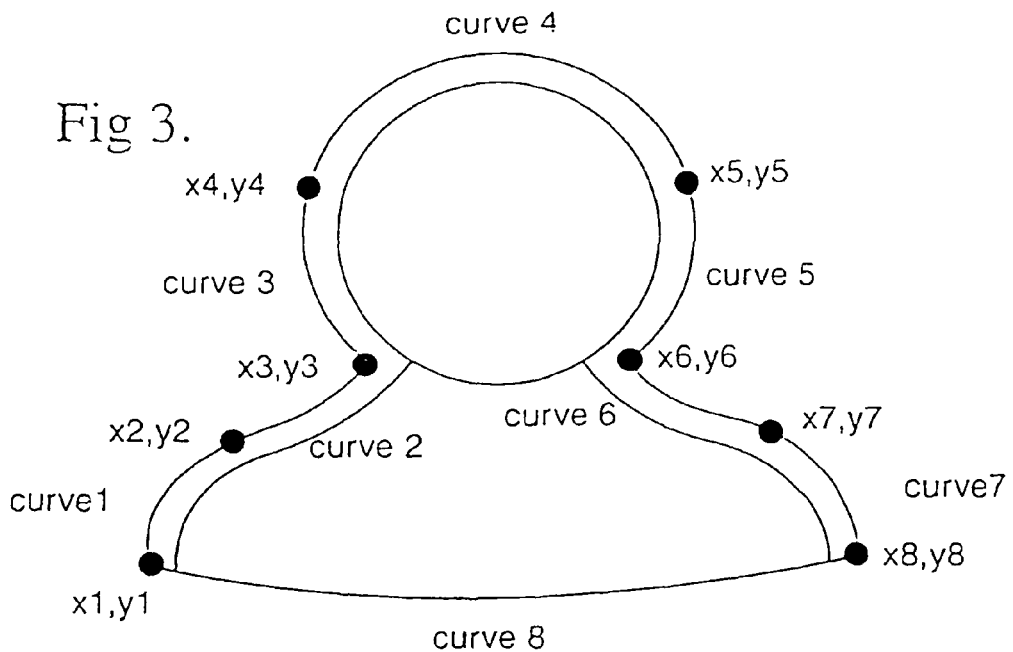
Object Number 1, Depth 20
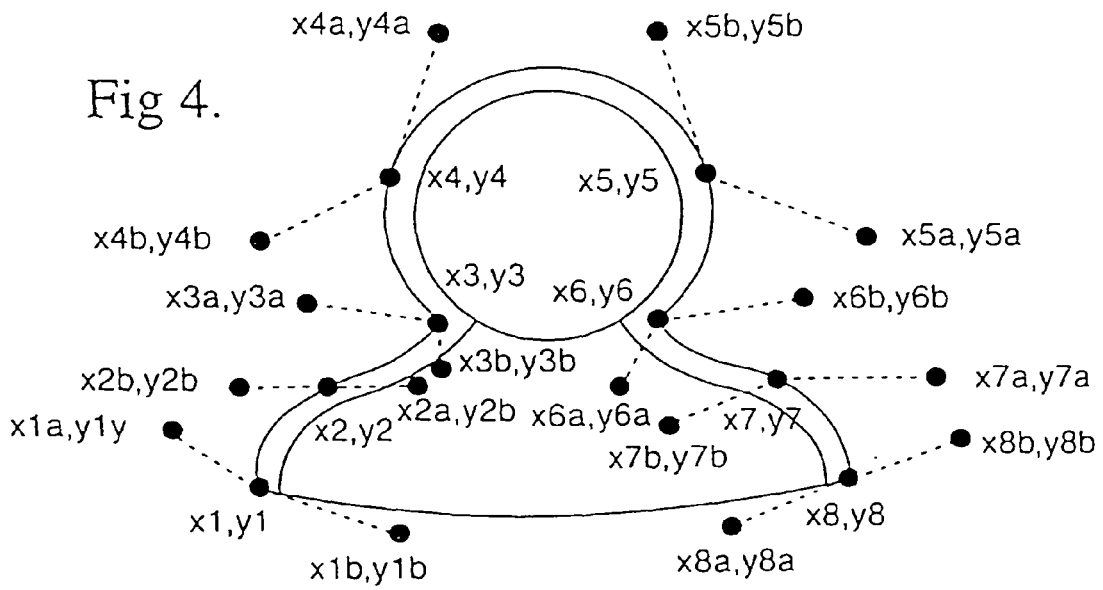
Object Number 1, Depth 20

Object Number 1, Depth 20

Object Number 1, Depth 20

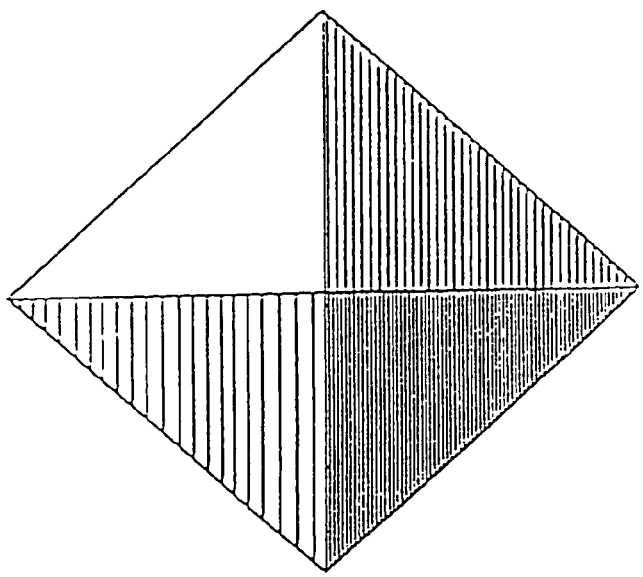
Fig 17.
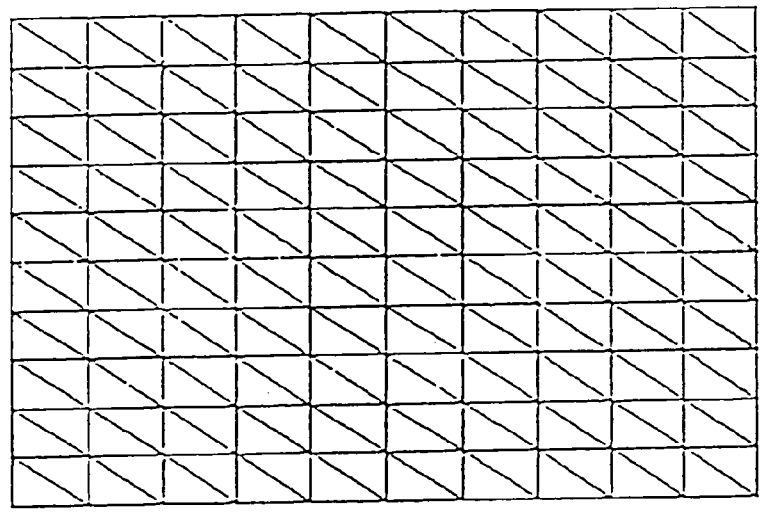
Fig 18.
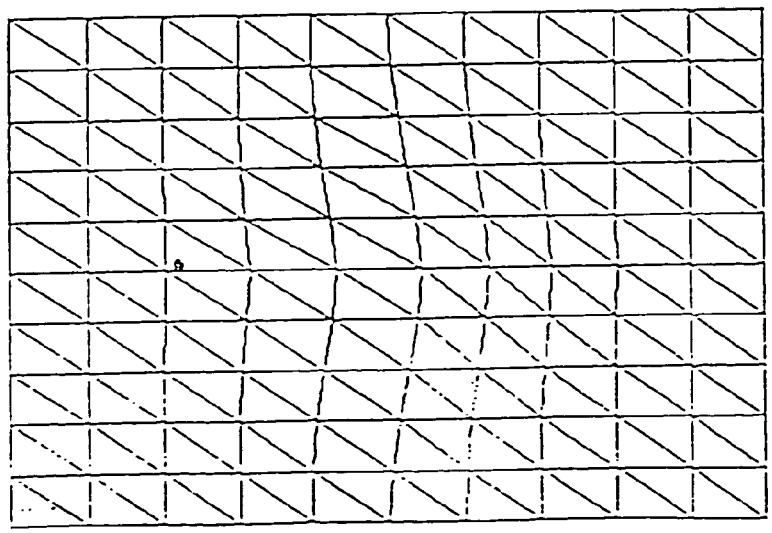

Fig 19.
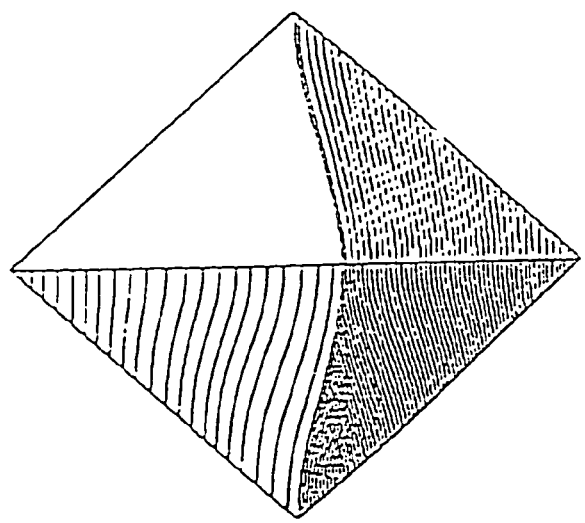
Fig 20.
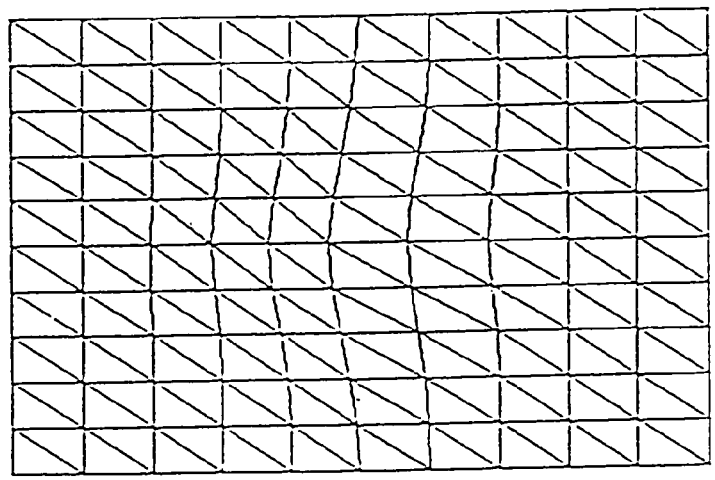
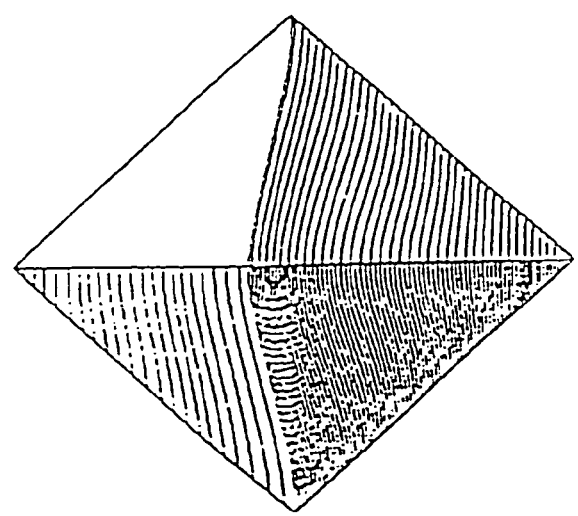

IMAGE CONVERSION AND ENCODING TECHNIQUES

CROSS REFERENCE TO RELATED APPLICATIONS

The present application is a continuation of International Application No. PCT/AU98/01005 (published as International Publication No. WO 99/30280), filed Dec. 3, 1998 and designating the United States, which in turn claims priority from Australian Application Nos. PP 2865, filed Apr. 8, 1998 and PP 0778, filed Dec. 5, 1997, the teachings of all of which are incorporated herein by reference.

BACKGROUND OF THE INVENTION

The present invention is generally directed towards stereoscopic image synthesis and more particularly toward an improved method of converting two-dimensional (2D) images for further encoding, transmission and decoding for the purpose of stereoscopic image display. The Applicants have previously described in PCT/AU96/00820, a method of producing left and right eye images for a stereoscopic display from an original 2D image including the steps of a. identifying at least one object within an original image b. outlining each object c. defining a depth characteristic for each object d. respectively displacing selected areas of each object by a determined amount in a lateral direction as a function of the depth characteristic of each object, to form two stretched images for viewing by the left and right eyes of the viewer.

These steps can be individually and collectively referred to as Dynamic Depth Cuing or DDC.

SUMMARY OF THE INVENTION

The present invention further improves the operation of the Applicant's earlier system.

The present invention provides in one aspect a method of producing a depth map for use in the conversion of 2D images into stereoscopic images including the steps of:

identifying at least one object within a 2D image;

allocating an identifying tag to the at least one object;

allocating a depth tag to the at least one object; and determining and defining an outline for the at least one object.

In a further aspect, the present invention provides a method of encoding a depth map for use in the conversion of 2D images into stereoscopic images including:

allocating an object identifier to an object;

allocating a depth tag to the object; and defining the object outline.

The object outline may be defined by a series of coordinates, curves and/or geometric shapes. Conveniently, the identifying tag can be a unique number.

In another aspect, the present invention provides for the use of bezier curves to generate an outline of an object in a 2D to 3D conversion process.

In yet a further aspect, the present invention provides for the use of curves to define an object in a 2D to 3D conversion process.

In another aspect, the present invention provides for the use of geometric shapes to define an outline of an object in a 2D to 3D conversion process.

In another aspect, the present invention provides a method of transmission of depth map information wherein the information is included in the Vertical Blanking Interval or MPEG data stream In still a further aspect, the present invention provides for the use of generic libraries to assist in the 2D to 3D conversion process.

To provide a better understanding of the present invention, reference is made to the accompanying drawings which illustrate a preferred embodiment of the present invention.

BRIEF DESCRIPTION OF THE DRAWINGS

In the drawings:

FIGS. 1 and 2 shows a preferred method of conversion from depth map data to distortion grid.

FIGS. 3, 4, 5 and 6 show various techniques of determining the outline of an object as disclosed by the present invention.

FIG. 17 depicts an original frame on an undistorted mesh.

FIG. 18 shows a sample mesh modified with an X displacement map.

FIG. 19 shows a sample combination of original frame mesh and displacement mesh.

FIG. 20 shows a sample resultant stretched image for an alternate eye.

DETAILED DESCRIPTION

Object Identification

Figure 2B:
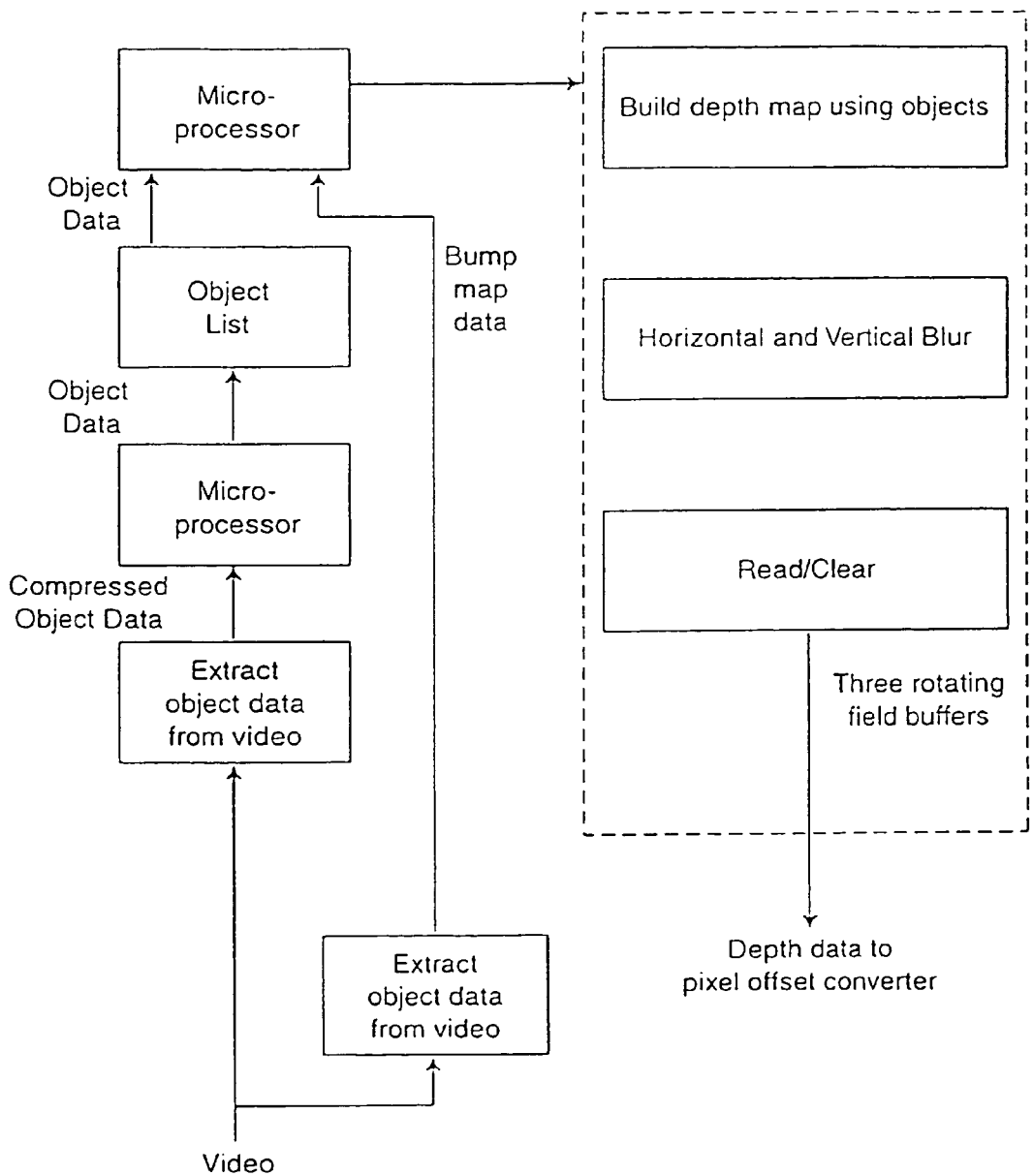

Objects in the 2D image to be converted may be identified by a human operator using visual inspection. The operator will typically tag each object, or group of objects, in the image using a computer mouse, light pen, stylus or other device and assign a unique number to the object. The number may be manually created by the operator or automatically generated in a particular sequence by a computer.

Objects may also be identified fully automatically using a computer or semi-automatically whereby an operator assists the computer to determine the location of an object(s).

To automatically identify an object, the computer will use such characteristics as object size, color, speed of motion, shading, texture, brightness, obscuration, focus as well as differences between previous and current and future images. Neural networks and expert systems may also be used to assist with identifying objects.

In semi-automatic object identification, an operator may provide assistance to the computer by advising the computer as to the nature of the image where objects may be found. For example, the operator may advise the computer that the scene is of the generic format "News Reader" in which case the computer will attempt to locate the head and shoulders of the news reader, desk and background, etc. The operator may choose from a menu of possible generic scenes. The operator may manually override and/or correct and adjust any object selection made by the computer. The computer program may learn from these corrections, using neural networks or expert systems for example, so as to continually improve the accuracy of object identification and numbering.

Once an object has been identified and numbered, the object may then be tracked manually, automatically or semi-automatically as it moves within the image over successive frames.

An operator may also use object identification information produced by another operator either working on the same sequence or from prior conversion of similar scenes.

Object Outlining

The outline of an object or objects may be determined manually, automatically or semi-automatically.

In manual outlining, the operator may trace the outline of the object or objects using a computer mouse, light pen, stylus or other device. The operator may select the outline of the object on a pixel-by-pixel basis, use straight line or curve approximations, bezier curves or best fit from a library of curves or generic shapes. The operator may also choose from a library of generic shapes which may already be of approximately the correct shape and scale or adjust the shape dynamically to fit. For example, the operator may wish to select the outline of a man in which case the generic outline of a man may be retrieved from the library and adjusted accordingly, manually, semi-automatically or automatically. The operator may also select from a library of geometric shapes such as circles, ellipses, triangles, squares, etc.

In automatic outlining, the computer may use such characteristics as size, color, speed of motion, shading, brightness, obscuration, and differences between previous and current and future images. Neural networks and expert systems may also be used to determine the outline of objects.

In semi-automatic outlining, an operator may provide assistance to the computer by advising the computer as to the nature of the image where objects may be found. For example, the operator may advise the computer that the scene is of the generic format "News Reader" in which case the computer will attempt to locate the head and shoulders of the news reader, desk and background, etc. The operator may choose from a menu of possible generic objects. The operator may manually override and/or correct and adjust any object outlining made by the computer. The computer program may learn from these corrections, using neural networks or expert systems for example, so as to continually improve the accuracy of outlining.

Once an object has been outlined, the object may then be tracked manually, automatically or semi-automatically as it moves within the image over successive frames.

An operator may also use object outline information produced by another operator either working on the same sequence or from prior conversion of similar scenes. The operator may also choose from a library of predefined outlines, which may include geometric shapes such as circles, ellipses, triangles, squares, etc., and manually, semi-automatically or automatically adjust the library outline to fit the selected object. The library may be indexed by individual outlines, e.g., News Reader or based upon a particular family of objects, e.g., Horse Race, Evening News, etc.

Defining Depth

The depth of an object or objects may be determined manually, automatically or semi-automatically. The depth of the objects may be assigned using any alphanumeric, visual, audible or tactile information. In the preferred embodiment, the depth of the object is indicated by shading the object with a particular color. Typically, this will be white for objects that are to appear, once converted, at a 3D position closest to the viewer and black for objects that are at the furthest 3D distance from the viewer. Obviously, this convention may be altered, e.g., reversed or colors used to indicate relative or absolute depth.

In another embodiment, the depth of the object may be assigned a numerical value. This value may be positive or negative, in a linear or nonlinear series and contain single or multiple digits. In a preferred embodiment, this value will range from 0 to 255, to enable the value to be encoded in a single byte, where 255 represents objects that are to appear, once converted, at a 3D position closest to the viewer and 0 for objects that are at the furthest 3D distance from the viewer. Obviously, this convention may be altered, e.g., reversed or another range used.

In manual depth definition, the operator may assign the depth of the object or objects using a computer mouse, light pen, stylus or other device. The operator may assign the depth of the object by placing the pointing device within the object outline and entering a depth value. The depth may be entered by the operator as a numeric, alphanumeric or graphical value and may be assigned by the operator or automatically assigned by the computer from a predetermined range of allowable values. The operator may also select the object depth from a library or menu of allowable depths.

The operator may also assign a range of depths within an object or a depth range that varies with time, object location or motion or any combination of these factors. For example, the object may be a table that has its closest edge towards the viewer and its farthest edge away from the viewer. When converted into 3D, the apparent depth of the table must vary along its length. In order to achieve this, the operator may divide the table up into a number of segments and assign each segment an individual depth. Alternatively, the operator may assign a continuously variable depth within the object by shading the object such that the amount of shading represents the depth at that particular position of the table. In this example, a light shading could represent a close object and dark shading a distant object. For the example of the table, the closest edge would be shaded lightly, with the shading getting progressively darker, until the furthest edge is reached.

The variation of depth within an object may be linear or non-linear and may vary with time, object location or motion or any combination of these factors.

The variation of depth within an object may be in the form of a ramp. A linear ramp would have a start point (A) and an end point (B). The color at point A and B is defined. A gradient from Point A to Point B is applied on the perpendicular line.

A Radial Ramp defines a similar ramp to a linear ramp although it uses the distance from a center point (A) to a radius (B).

A simple extension to the Radial Ramp would be to taper the outside rim, or to allow a variable sized center point.

A Linear Extension is the distance from a line segment as opposed to the distance from the perpendicular. In this example, the color is defined for the line segment, and the color for the "outside". The color along the line segment is defined, and the color tapers out to the "outside" color.

A variety of ramps can be easily encoded. Ramps may also be based on more complex curves, equations, variable transparency, etc.

In another example, an object may move from the front of the image to the rear over a period of frames. The operator could assign a depth for the object in the first frame and depth of the object in the last or subsequent scene. The computer may then interpolate the depth of the object over successive frames in a linear or other predetermined manner. This process may also be fully automated whereby a computer assigns the variation in object depth based upon the change in size of an object as it moves over time.

In automatic depth defining, the computer may use such characteristics as size, color, speed of motion, shading, brightness, obscuration, focus, and differences between previous and current and future images. Neural networks and expert systems may also be used to determine the depth of objects.

In semi-automatic depth defining, an operator may provide assistance to the computer by advising the computer as to the nature of the image where depths are to be assigned. For example, the operator may advise the computer that the scene is of the generic format "News Reader" in which case the computer will attempt to locate the head and shoulders of the news reader, desk and background, etc and place these in a logical depth sequence. The operator may choose from a menu of possible generic objects and depths. The operator may manually override and/or correct and adjust any object depth decision made by the computer. The computer program may learn from these corrections, using neural networks or expert systems for example, so as to continually improve the accuracy of depth assigning.

Once an object has been assigned a specific depth, the object may then be tracked manually, automatically or semi-automatically as it moves within the image over successive frames.

An operator may also use depth definitions produced by another operator either working on the same sequence or from prior conversion of similar scenes.

Multiple Operators

In order to convert a video sequence in a timely manner, it may be necessary for a number of operators to be working on the 2D source material. Whilst these could be located in the same premises, by using on-line computer services, for example the Internet, operators could be located anywhere worldwide. In such an arrangement, to ensure the security of the source material, it may be necessary to remove the audio and modify the colors of the image. This will have no effect on the operator's ability to determine the outline of an object, but prevents pirating of the original source material. As the actual selection of an object's outline is a relatively simple process, this could most cost effectively be performed in countries with low labor costs. In using this arrangement, the conversion procedure could conveniently be as follows:

1. A supervising operator identifies a video sequence to be converted into 3D and numbers each frame of the sequence.

2. The supervisor applies the necessary security procedures if necessary.

3. The supervisor identifies the object(s) in the scenes that require outlining and uniquely tags each as previously described.

4. The video sequence is then converted into a suitable digital format and transmitted via the on-line service to the remote destination(s). For long video sequences, this may be uneconomical in which case delivery on CD-ROM or other back-up media may be preferable.

5. The sequence is received by the remote location where the operator(s) undertake the object manipulation.

6. Since the results of the manipulation result in the object outlines being identified, the data for which may be subsequently compressed, the file size will generally be substantially smaller than the original images. This being the case, the object information may conveniently be returned to the supervisor using on-line email services.

7. The supervisor undertakes quality control on the object outlines received and matches the frame numbers to the original video source material.

8. The supervisor then passes the object outlines and original source material to a subsequent operator who applies the necessary depth information for each object.

Since the application of depth information is an artistic and creative process, it is considered desirable, although not essential, that this be undertaken in a central location by a small group of operators. This will also ensure consistency of object depths over a long sequence.

Defining Complex Depth

In order to produce more realistic looking 3D images, it is sometimes desirable to utilize depth definitions that are more complex than simple ramps or linear variations. This is particularly desirable for objects that have a complex internal structure with many variations in depth, for example, a tree. The depth map for such objects could be produced by adding a texture bump map to the object. For example, if we consider a tree, the first step would be to trace around the outline of the tree and then assign the tree a depth. Then a texture bump map could be added to give each leaf on the tree its own individual depth. Such texture maps have been found useful to the present invention for adding detail to relatively simple objects.

However, for fine detail, such as the leaves on a tree or other complex objects, this method is not preferred, as the method would be further complicated should the tree, or the like, move in the wind or the camera angle change from frame to frame. A further and more preferred method is to use the luminance (or black and white components) of the original object to create the necessary bump map. In general, elements of the object that are closer to the viewer will be lighter and those further away darker. Thus, by assigning a light luminance value to close elements and dark luminance to distant elements a bump map can be automatically created. The advantage of this technique is that the object itself can be used to create its own bump map and any movement of the object from frame to frame is automatically tracked. Other attributes of an object may also be used to create a bump map; these include but are not limited to, chrominance, saturation, color grouping, reflections, shadows, focus, sharpness, etc.

The bump map values obtained from object attributes will also preferably be scaled so that the range of depth variation within the object is consistent with the general range of depths of the overall image.

Depth Maps

The process of detecting objects, determining their outline and assigning depths we will refer to as the creation of Depth Maps. In a preferred embodiment, the depth maps would consist of grayscale images of 80×60×8 bit resolution to enable the objects within the associated 2D image to be defined at one of 256 individual depths.

Alternatively, the shape of the curve can be defined as a ratio of the distance between the sequential x,y coordinates and the displacement of the curve from a straight line between these points. x1,y1 and x2,y2 located on a line A and being joined by a curve. The curve between these points has a maximum displacement B measured from the line A to the midpoint of the curve. The curve can therefore be defined as follows:

$$curve = B/A$$

which preferably will have a value from −128 to +128 with 0 indicating a straight line between the two points. It should be noted that since the value assigned to the curve is the ratio of two measurements then the same curve value may be assigned to other curves that have the same B/A ratio.

Encoding of Depth Maps

The depth maps may be encoded in a number of ways. In a preferred embodiment, the object number, depth and object outline are encoded as follows. Consider the outline of a person shown in FIG. 3. The person is allocated object number 1 with depth 20. The outline of the object has been determined as previously explained and at specific x,y locations. Typically, where a change in direction of the object outline takes place, a particular mark is made. This mark may be an alphanumeric character, a shape, color or other form of visual indication. Each of these marks will have a specific x,y location. In the preferred embodiment, this will be within the range 0 to 255. Between each pair of x,y locations will exist a curve. Each curve may be determined by selection from a library of all possible curve shapes. In the preferred embodiment, each curve will be given a value typically within the range −127 to +128 to enable the curve to be defined using one byte. Curves that progress clockwise from x,y location to the next x,y location may be assigned positive values, whilst those that progress counterclockwise may be assigned negative values. Other assignments may be applied.

Depth Threshold

Adding a depth threshold to the conversion algorithm ensures that objects in front of the threshold are not distorted. This is done to prevent some of the minor distortions that occur at the edges of foreground objects when they intersect with a background object.

In the preferred conversion algorithm, a depth map is used to create a continuous depth map that forms the 3D profile of the final scene. When a threshold is applied to this process the depth map is processed to detect threshold transitions, and depth above and below the transition is processed independently.

The depth map data for this object may therefore be defined as follows:

<object number><object depth><x1,y1, curve1, x2,y2, curve2 x1,y1>.

The object depth information contains the data required to generate the depth of the current object. As previously mentioned, this depth data may be a single value, a ramp (linear, radial or other), or other method of describing the depth of a single object. The following methods demonstrate possible means of encoding the depth data of a single object.

The depth data may be encoded as follows for a single depth value:

<depth flat 1><depth value>.

The depth data may be encoded as follows for an object with a linear ramp as its depth value:

<depth flag 2><x1,y1, depth value1, x2,y2, depth value2> where the depth of the object varies linearly from value 1 at x1,y1 to value 2 at x2,y2.

The depth data may be encoded as follows for an object with a non-linear ramp as its depth value:

<depth flag 3><x1,y1, depth value1, x2,y2, depth value2, gamma> where gamma is a value that describes the non-linear variation of depth over the range between x1,y1 and x2,y2.

The depth data may be encoded as follows for an object with a radial ramp as its depth value:

<depth flag 4><x1,y1, depth value1, radius, depth value2> where the object has depth value 1 at x1,y1 and the depth varies linearly or otherwise to a value of depth value 2 at all points radius pixels away from x1,y1.

It will be understood that once an object's depth map has been transmitted it is not necessary to transmit the depth map again until the object moves or changes shape. Should only the object's position change then the new position of the object may be transmitted by assigning an offset to the object's position as follows:

<object number><xoffset, yoffset> similarly should the objects depth change and not its position or size the following may be transmitted <object number><depth>

It will also be understood that adjacent touching objects will share x,y coordinates and that redundancy therefore exists in the x,y coordinates that need to be transmitted to uniquely define the depth maps of every object in the scene.

In order to minimize the amount of additional data required to be transmitted or stored it is desirable to compress the data comprising the depth maps. The compression can use any form of data compression algorithm and many will be known to those skilled in the art. Examples of compression include, although not limited to, run length encoding and Huffman encoding. Since objects may not move from frame to frame, it is only necessary to transmit the difference in the depth maps between frames. Techniques that enable the differences between frames to be measured and processed are also known to those skilled in the art.

It will be appreciated that the depth map information may be included in the Vertical Blanking Interval (VBI) of an analog television signal or MPEG or other digital transmission stream of a digital television signal as has previously been disclosed for distortion mesh transmission. Similarly, the depth map data can be added into the VOB file on a DVD.

It is known how the data may be included in the VBI and the MPEG data stream and the preferred embodiment is the technique currently used for including Closed Captioning and Teletext within standard television images. In another preferred embodiment, the data may be included within the User Data area of the MPEG data stream.

In terms of including this data in the VBI or MPEG2 stream the following calculations indicate the likely size of the data requirements.

Assuming:

the VBI specification allows for 32 Bytes/video line the maximum number of objects per image=20 the maximum X,Y coordinates per object=20 that the Object #, Object depth, X, Y, and shape data each takes 1 Byte

Then the bytes/object=1+1+3(20)=62 Bytes

Hence for 20 objects VBI data=20×62=1240 Bytes/frame.

It should be noted that this is the worst case and in practice a typical scene requires 200 Bytes/frame. This value will decrease significantly with the application of suitable data compression and taking into account redundancy, etc.

In respect of including this information within an MPEG data stream, the MPEG standard allows for the delivery of a data stream to the receiving location. Techniques to provide delivery of data within a MPEG stream may be used to deliver the depth map data to the receiving decoder. It is also possible to include this information in one of the sound channels of the MPEG signal. Where the MPEG signal is recorded on a medium such as CD-ROM or DVD then the information may be contained within a digital audio file, as a separate digital or analog file, or recorded on the disk in other means. Other techniques will be obvious to those skilled in the art.

It is also possible to transmit the original depth map as part of the MPEG data stream. In a preferred embodiment, the resolution of the depth map may be reduced from typically 640×480×8 pixels to 80×60×8 pixels before noticeable errors in the depth of objects in the resulting 3D images become apparent. This resolution is the same as the DCT block size in an MPEG encoded video signal. Hence, the depth map information may be included in the MPEG signal by adding additional information to the DCT block that defines the depth of each block when converted into 3D. The depth map may also be included in the MPEG data stream as previously described, e.g., audio channel, or other methods familiar to those skilled in the art. The reduced resolution depth map may also be compressed, prior to inclusion in the MPEG stream, using standard image compression techniques including, but not limited to, JPEG, MJPEG, MPEG, etc.

In a further preferred embodiment, the object outline is defined using bezier curves. Consider the outline of a person shown in FIG. 4. Bezier curves are applied to the outline which result in the x,y coordinates shown. The depth map for the object may therefore be defined as <object number><object depth><x1,y1,x1a,y1a,x2b,y2b,x2,y2, . . . x1b,y1b>.

Figure 5:
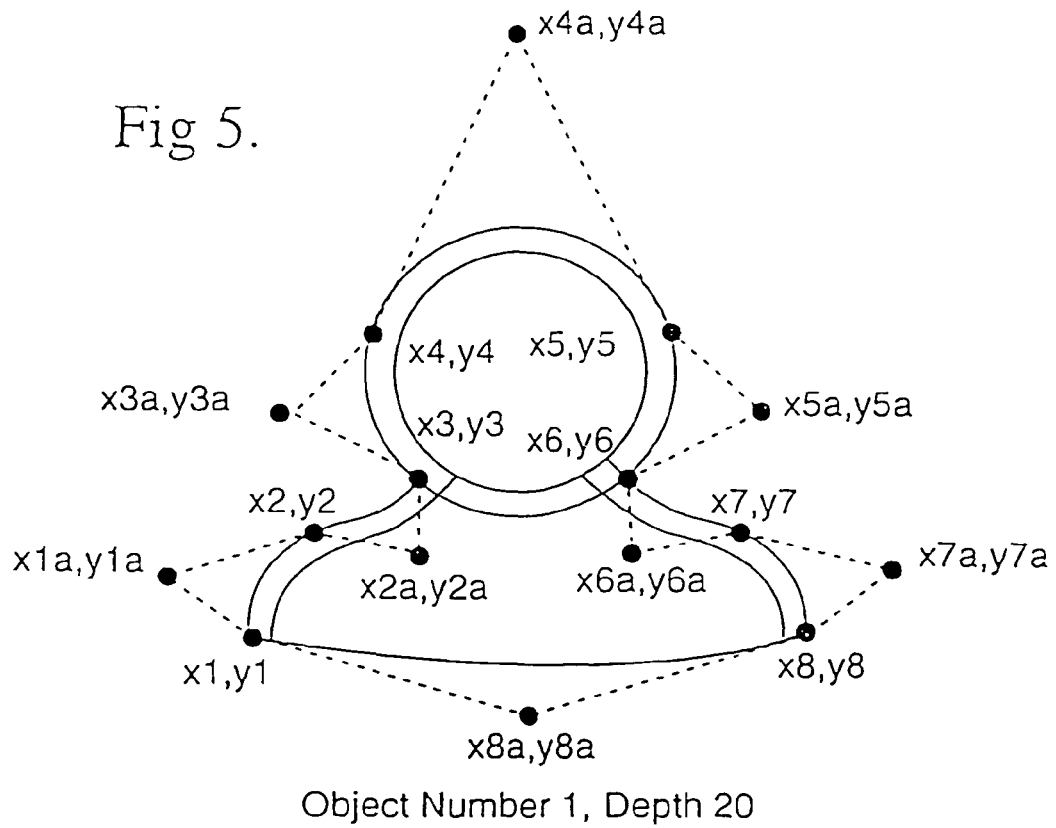
Figure 6:
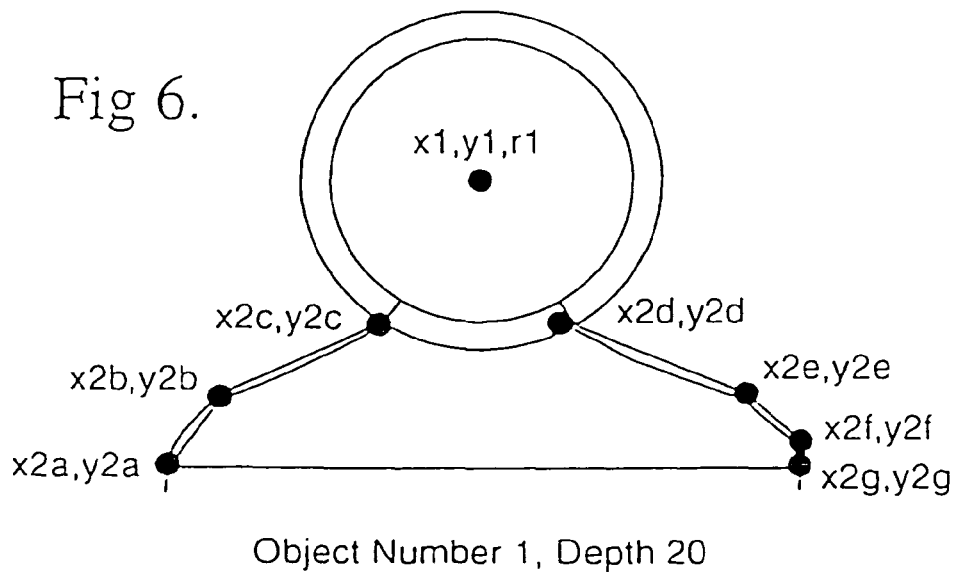

Bezier curves may also be generated that require only 3 x,y coordinates as illustrated in FIG. 5 and may be defined as follows <object number><object depth><x1,y1,x1a,y1a,x2,y2, . . . x8a,y8a>.

This method is preferable since it requires a smaller number of elements to define the curve.

In a further preferred embodiment, the object outline is defined using geometric shapes. Consider the outline of a person shown in FIG. 5. Geometric shapes are applied to the outline which result in the construction shown. The circle forming the head will have a center defined by x1,y1 and radius r1. Triangles can be described as x2a, y2a, x2b, y2b, x2c, y2c and similarly for other polygons. Each geometric shape may have the general form <shape><parameters>.

The depth map for the object may therefore be defined as

<object number><object depth><$shape_1$><parameters><$shape_n$><parameters>.

It will also be appreciated that the outlines and/or depth maps created using any of these methods, either compressed or uncompressed, may be stored in any suitable analog or digital format and medium, either with or without their associated 2D images. The storage may include, but not limited to, floppy disk, hard disk, CD-ROM, laser disk, DVD, RAM, ROM, magnetic recording tape, video tape, video cassette, etc. The stored outlines and/or depth maps may be recalled at a later time and/or place to enable the reconstruction of the depth maps for the generation of distortion meshes for the generation of 3D images or for further adjustment and fine tuning.

Decoder

Previously it has been disclosed that a distortion mesh may be used to convert a 2D image into 3D.

It is now possible to generate the necessary distortion grid from a depth map. This depth map itself being generated from additional information transmitted within the 2D video. The generation of a distortion grid from a depth map may take place in realtime, semi-realtime or offline and may be undertaken locally or, via any suitable transmission medium, at a remote location. The generation may be implemented in software or hardware.

Thus, rather than transmit the sub pixel points of the distortion mesh as part of the 2D image the information necessary to re-create the depth map may be transmitted. The depth map may then be reconstructed at the decoder and the conversion into a distortion grid undertaken. These conversions may be undertaken in realtime, semi-realtime or offline at the receiving location and may be implemented in software or hardware. The preferred method of conversion from depth map data into depth map then to distortion grid is as shown in a software flow chart in FIG. 1 and in hardware in FIG. 2. The individual elements of the software conversion process function as follows:

Image Sequence Source—2D Film or Video or some other image sequence source.

Area & Depth Source—This is the information that is sent with the Image Sequence and in the preferred embodiment is contained in the VBI or MPEG data stream. It contains information as to the position, shape and depth of each object.

Apply Areas with Depths to Depth Map—To render an object, the "area" within the object is filled/shaded according to the depth information. All areas outside the shaded area are left untouched. This process results in the reconstruction of the original depth maps.

Blur Depth Map—The hard depth map is then blurred (gaussian, fast or other) to remove any hard edges. The blurring provides a smooth transition between the objects in order to eliminate image overlapping. The blurring is slightly weighted in the horizontal direction. The vertical blur helps stop image tearing by bleeding into the images above and below thus giving a smoother transition between near and far objects.

Process Image using Depth Map—The blurred depth map is then used as a source for displacement of the distortion grid, white being maximum displacement, black being no displacement. The amount of distortion along the horizontal axis is scaled according to the depth of the depth map at any given pixel location. In the preferred implementation, the displacement for the left image is to the right, the right image displacement to the left. An overall forced parallax may be applied to the image so that the white (foreground) displaced objects are converged at screen level. The black (background) areas will then have a forced parallax equal to an unshifted image. The direction of displacement, and forced parallax, may be varied to suite the particular requirements of the 3D display system on which the converted images are to be displayed.

Once the distortion grid has been generated, the conversion of the 2D image into 3D is undertaken as previously disclosed.

A preferred embodiment of a hardware converter to generate separate left and right images from a distortion grid is shown in FIG. 2, which could be fully digital. A method of implementing this process is shown in FIG. 2a and operates as follows.

The system uses two line stores, which are multi-ported to allow simultaneous access. A line of video is written into one of the line stores while the other line store is being read to generate the output video signal. At the end of the current line the line stores are swapped.

The depth information is extracted from the video signal to regenerate the depth map for the current image. For each output pixel, the depth map is translated into a pixel offset (of the distortion grid). The pixel offset is added to the pixel counter as the video line is read out of the line store. The pixel offset is a fractional value, so it is necessary to read the pixel values each side of the desired pixel and interpolate the intermediate value. The odd/even field signal from the video decoder is used to control the field sequential video output and to synchronize the viewers shutter glasses to the output video signal. The basic circuitry may be duplicated to generate separate left and right video signals for 3D displays that require this video format.

A Functional block diagram of the DDC Decoder is shown in FIG. 2b. The first process is to extract the object data from the incoming video which may be inserted in the VBI or MPEG data stream. The extracted data will be in compressed format and is subsequently decompressed using a microprocessor. The output from the microprocessor is the original object outline information and is again processed to produce the depth information for each object. This data is passed to a set of three rotating field buffers, the buffers being controlled by a microprocessor. The first buffer recreates the original depth maps. The depth maps are then passed to the next buffer where the horizontal and vertical blurs are applied. Once the blurring has been applied, the resulting data is applied to the final buffer where the data is passed to the Depth to Pixel Offset Converter shown in FIG. 2a. Once the data has been transferred to the Offset Converter, the final buffer is cleared and is ready to receive the next depth map.

Figure 2C:
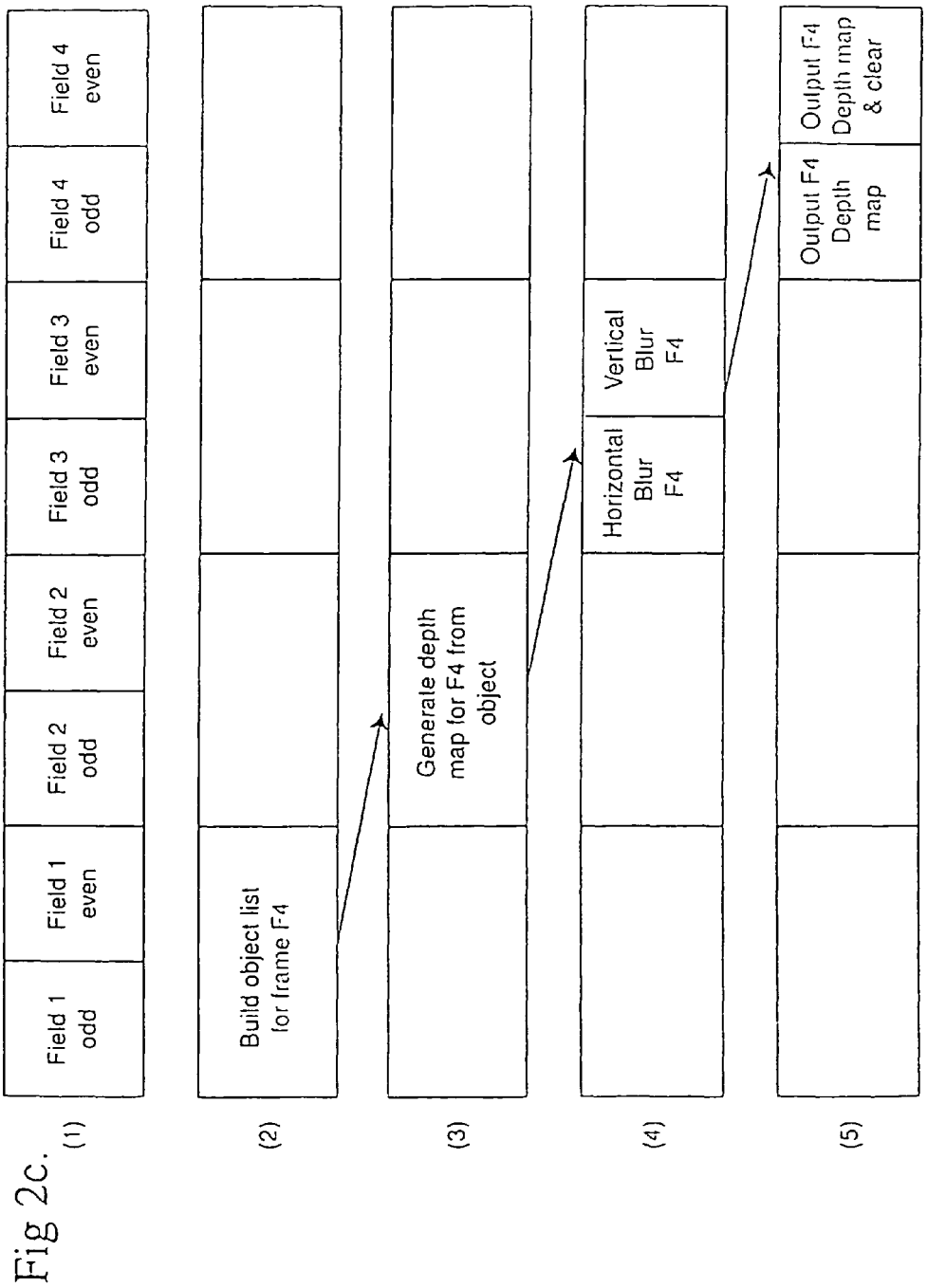

The DDC Decoder process is illustrated in FIG. 2c. This shows the process as a timing diagram and assumes that current microprocessors are not sufficiently fast to undertake all the decoding processes simultaneously. The decoding process is therefore undertaken sequentially in a pipeline process. As microprocessor performance improves it is expected that a number, if not all, of these processes will be undertaken simultaneously. In FIG. 2c (1) four frames of video are shown, each frame comprising odd and even fields. At (2) the object list for frame four is generated whilst at (3) the depth map for frame 4 is generated. At (4) the horizontal and vertical blurs are applied and at (5) the depth map for frame 4 is output and the buffer is cleared ready for the next object list. At (5) therefore the depth map for frame 4 and the 2D image are concurrently available to enable the conversion into 3D. It should be noted that FIG. 2c illustrates the process for an individual frame and in practice, at any one time, depth maps for four different frames are being generated by different sections of the hardware.

Alternative Decoders

As stated previously, currently available microprocessors are not sufficiently fast to undertake all of the decoding processes simultaneously. Therefore an alternative preferred embodiment of a decoder will be described that does not require the use of a fast microprocessor. This alternative decoder makes use of integrated circuits that have been developed for the processing of 2D and 3D computer graphics. Such dedicated graphics processors are capable of rendering greater than 500,000 polygons per second. Since these integrated circuits are manufactured in large quantities, and are thus inexpensive, the production of a low cost DDC decoder is realisable. The decoder uses the simplest polygon rendering capabilities of a graphics processor, unshaded texture mapped polygons.

Figure 9:
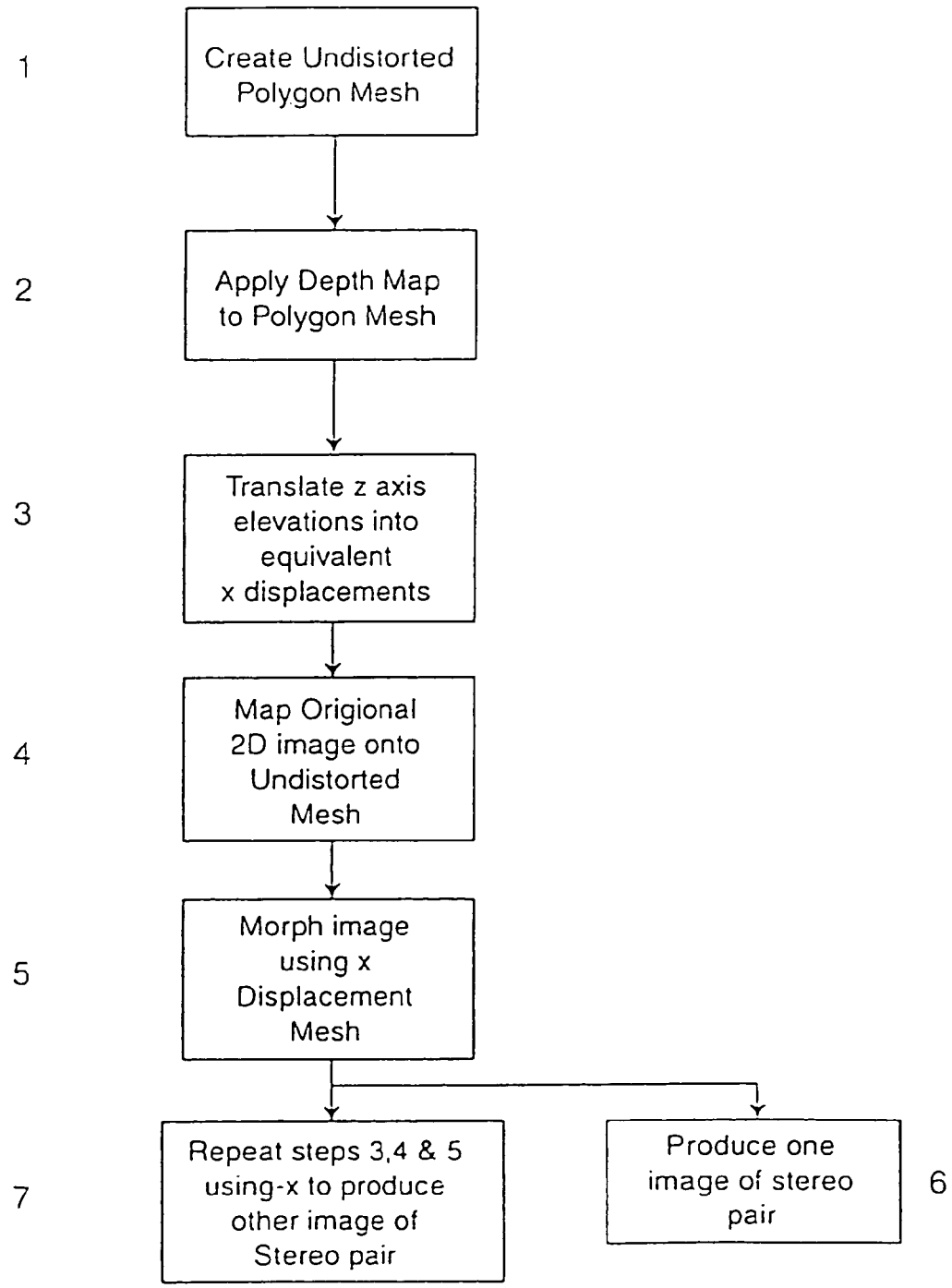
FIG. 9 shows a sample flow diagram of a decoding process of an alternative decoder.

The decoding process may be more easily understood by explaining the process as if performed manually. This is illustrated by the flow chart in FIG. 9 and subsequent drawings.

Figure 10:
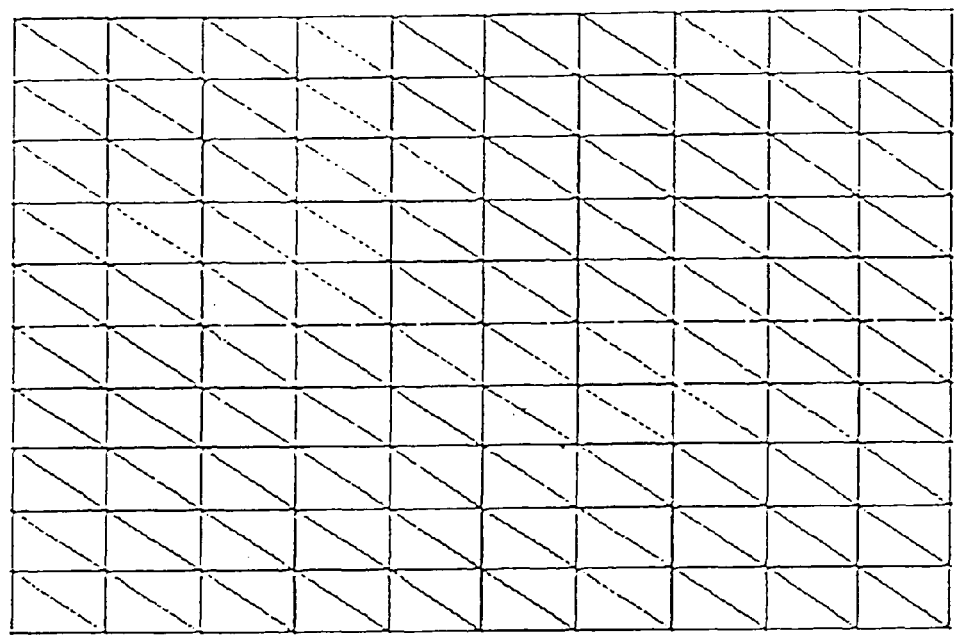
FIG. 10 shows an example of an undistorted mesh.
Figure 11:
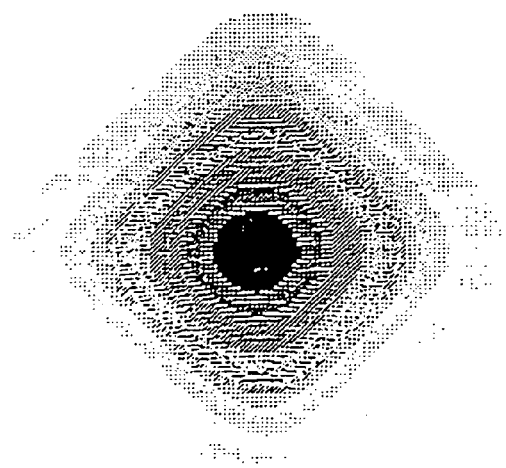
FIG. 11 shows a sample depth map of a cone.
Figure 12:
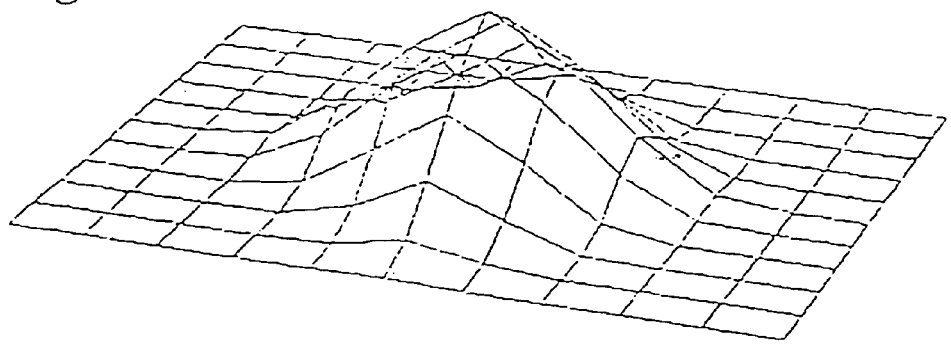
FIG. 12 shows a sample mesh modified with a depth map.
Figure 13:
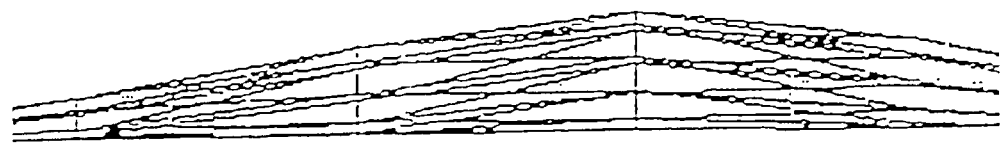
FIGS. 13 to 16 show one method of translating depth maps Z elevations into X displacements.
Figure 14:
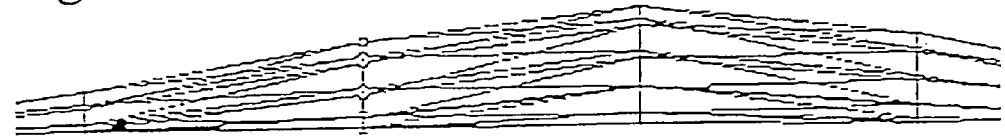
Figure 15:
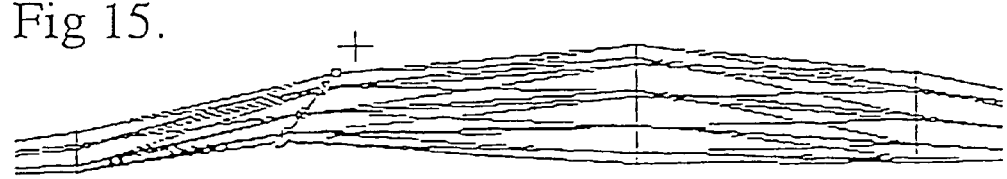
Figure 16:

The process commences by producing an undistorted mesh, using as many polygons in the xy plane as necessary to achieve a relatively smooth deformation. In the preferred embodiment 10,000 polygons per field may typically be used. An example of a section of undistorted mesh is shown in FIG. 10. The depth map for the object to be converted into 3D (in this example, a cone whose tip is orientated towards the viewer as per FIG. 11) is applied to the mesh which is modified such that the z-axis elevation of the mesh's polygons is dependant upon the value of the corresponding pixel in the depth map. This is illustrated in FIG. 12. The next step in the process is to translate the z-axis elevation of each polygon into an equivalent x displacement. This is illustrated in FIGS. 13 through 16. In FIG. 13, an x-axis section through the z elevation mesh is shown. In FIG. 14 a row of points is selected along the x-axis and rotated 90° about the point y=0. FIG. 15 shows the effect of the rotation at the 45° point and FIG. 16 after 90° of rotation. This process is repeated for all x rows which effectively translates the depth maps z-axis elevations into an x displacement.

The next step in the process is to map the original video frame onto an undistorted mesh as per FIG. 17. The undistorted mesh is then morphed into the x displacement map generated previously as per FIG. 18. The resulting video image will then distend according to the mesh's displacement, FIG. 19. This has the same effect as stretching the image as described in our previous application PCT/AU96/00820. The stretched image may be used to form one view of a stereo pair, the other being formed by rotating the points in FIG. 13 by −90° which will produce a mesh and corresponding image as shown in FIG. 20.

Figure 21:
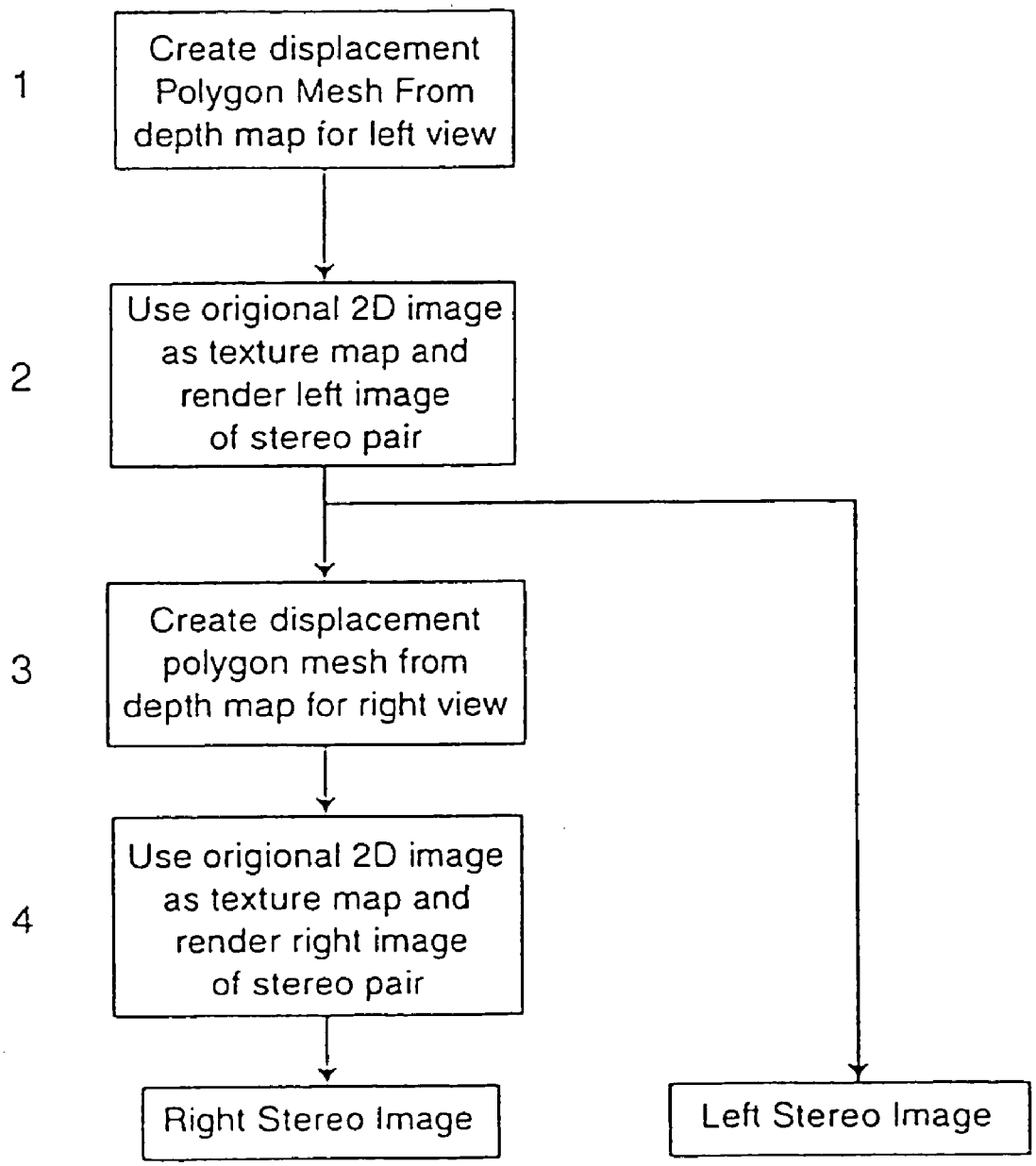
FIG. 21 shows a simplified displacements flow chart.

When implementing this process in hardware, using a 2D/3D graphics processor, it is possible to eliminate the step of translating the z-axis elevations into equivalent x displacements. Since it is known that polygons that are closer to the viewer require to be shifted further laterally than polygons further away from the viewer the displacement mesh of FIG. 18 can be produced directly from the depth map of FIG. 11. This can be achieved since there is a direct relationship between the grayscale value of the depth map and the shift of each corresponding polygon. This simplified process is illustrated as a flow chart in FIG. 21.

Alternative Hardware Decoder

Figure 8:
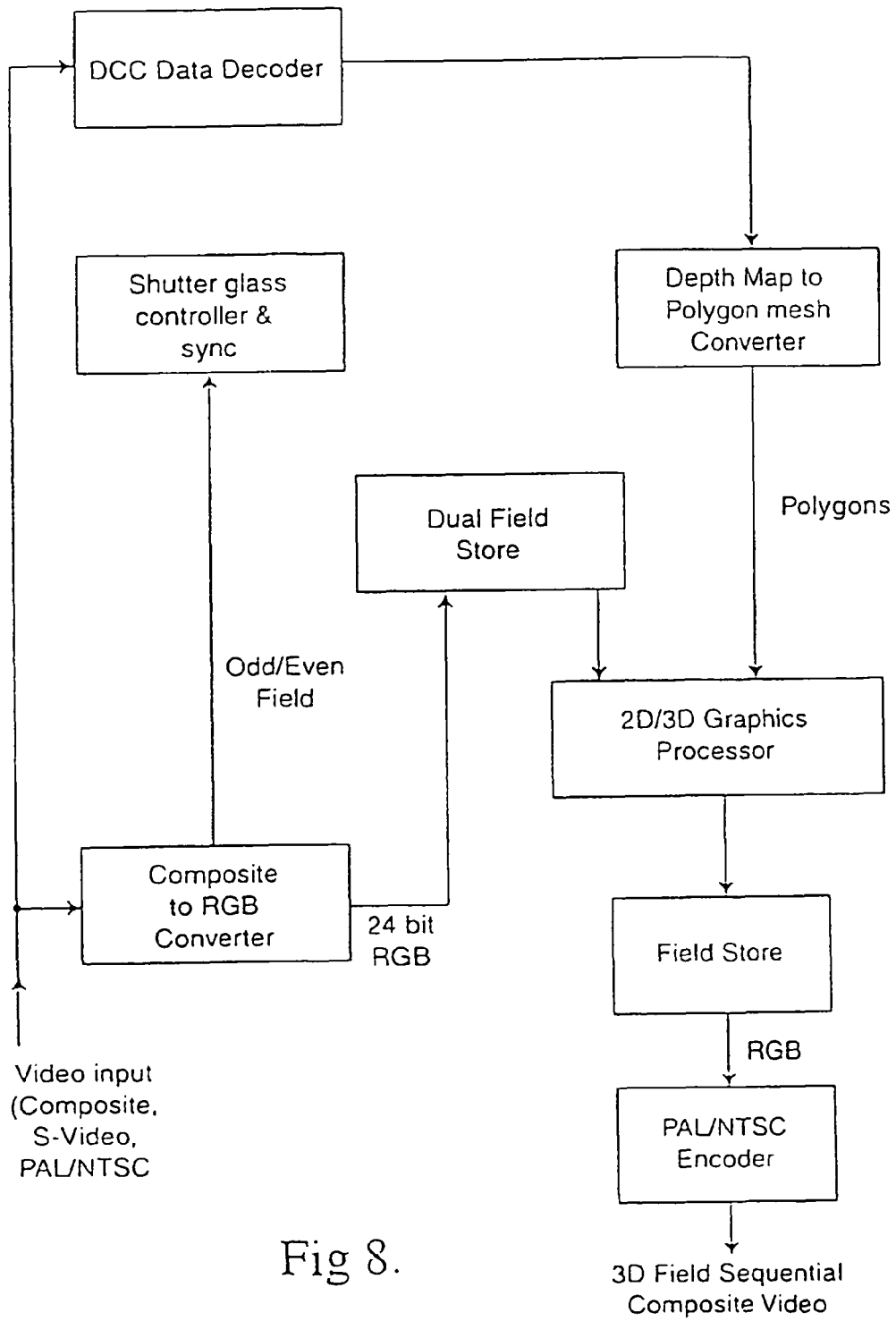
FIG. 8 shows a block diagram of a hardware decoder for an alternative decoder.

A block diagram of a hardware DDC decoder based upon a 2D/3D graphics processor is shown in FIG. 8. The extraction and generation of the depth maps from the DDC data remains as previously described and illustrated in FIG. 2b. The operation of the decoder can be as follows. Incoming video is passed to the DDC data decoder, which extracts the DDC information from the video stream and recovers the depth map for each video field. The video is also converted into RGB, YUV or other standard video format and placed into a dual field store. This enables a video field to be read out into the 2D/3D graphics processor at the same time as a new field is being loaded. The depth map output from the DDC data decoder is passed to the Depth Map to Polygon mesh converter, which defines the shape of the polygons to be processed by the 2D/3D graphics processor. The other input to the graphics processor is the original 2D video image, which is used as a texture map to which the polygons are applied. The output from the graphics processor is passed to a field store that enables the video to be read out in an interlaced format. This is subsequently passed to a PAL/NTSC encoder, the output of which will be a standard field sequential 3D video signal.

Re-use of Depth Maps

It will also be appreciated that it is not necessary to transmit the entire depth map to the receiver since the same depth maps will be reused when the same or a similar scene is displayed again. It is therefore desirable that the decoder retains in memory a sequence of previously transmitted depth maps for reuse rather than require to re-process a depth map that has been sent previously. Either the depth map or the resulting distortion mesh may be retained in the decoders memory which may be volatile or non-volatile and comprises, although not limited to, RAM, EEPROM, flash memory, magnetic or optical storage, etc. It is also intended that generic depth maps and/or distortion grids be stored in the decoder. This will enable frequently occurring scenes to be converted without the need to transmit or convert the depth map. The correct depth map may be selected by including data in the video signal that uniquely identifies to the decoder which default depth map to apply. It is also intended that the decoder should have the capability of receiving new or altered depth maps so as to enable a library of depth maps and/or distortion grids to be maintained within the decoder. This library may be held within, although not limited to, the following media RAM, EEPROM, flash memory, magnetic or optical storage, etc. It is intended that the library be updated by the transmission of specific depth maps or distortion grids that are included in the video signal. It is also intended that the library could be maintained by means of external or internal plug-in modules containing such depth maps or distortion grids and by down loading to the decoder via the video signal, modem or the Internet. Other means of maintaining the library will be obvious to those skilled in the art.

The general format of DDC Data included in the video signal may, in the preferred embodiment, include a header flag which indicates to the decoder the nature of the following data. A number of existing standards could be used for this format which in general will have the following format;

<Flag#><data to be acted upon by the decoder> examples of flags include, although not limited to, the following:

Flag 1—The following data is a depth map,

Flag 2—The following data relates to the relocation of an existing object,

Flag 3—The following data relates to the change in depth of an object,

Flag 4—The following data relates to the reuse of a previously transmitted depth map, Flag 5—The following data relates to the use of a depth map within the library, Flag 6—The following data relates to the modification of a depth map within the library, Flag 7—The following data relates to the addition of a new depth map within the library, Flag 8—The following data relates to the deletion of an existing library depth map, Flag 9—The following data relates to the use of motion parallax delays, Flag 10—The following data relates to the use of forced parallax, Flag 11—The following data relates to the use of a mathematical algorithm, Flag 12—The following data relates to the use of a mathematical algorithm library.

Alternatively, the length of each data packet could be a different length which would uniquely define each packet and alleviate the need for a Flag.

In the preceding description the same process could be applied to distortion grids.

It is also intended that the decoder should be able to determine the most suitable depth map to apply to the associated 3D image by automatically making a selection from a nominated range within the library. For example, the DDC data could direct the decoder to search the library of depth maps between specific index points or by generic category, i.e., Evening News, Horse Race. The decoder would then select the appropriate map based upon object size, shape, speed, direction, color, shading, obscuration, etc.

As a by product of the decoding process the original depth map, created during the encoding process, can be made available in a suitable format for use with 3D display systems that require a 2D image and object depth information. These displays may be autostereoscopic and/or volumetric in nature.

Alternative Approaches

Alternatively, the mesh distortion process may be defined by a mathematical algorithm. This algorithm may be stored in the decoder and the DDC data then comprises the parameters to which the algorithm is applied. For example consider the general formula $$f(x,y)=[1-\exp(-1(1x1-rx).dx1)].\sin(((PI.x)/rx)+PI/2).$$
$$[1-\exp(-1(1y1-ry).dy1)].\sin(((P1.y)/ry)+P1/2)$$

where $P1$-constant 3.14159...

$1 \times 1$-absolute value of $x$ $rx$-range of $x$, $-rx <= x <= rx$ $ry$-range of $y$, $-ry <= y <= ry$ $dx$-damping factor for $x$ $dy$-damping factor for $y$.

Figure 7:
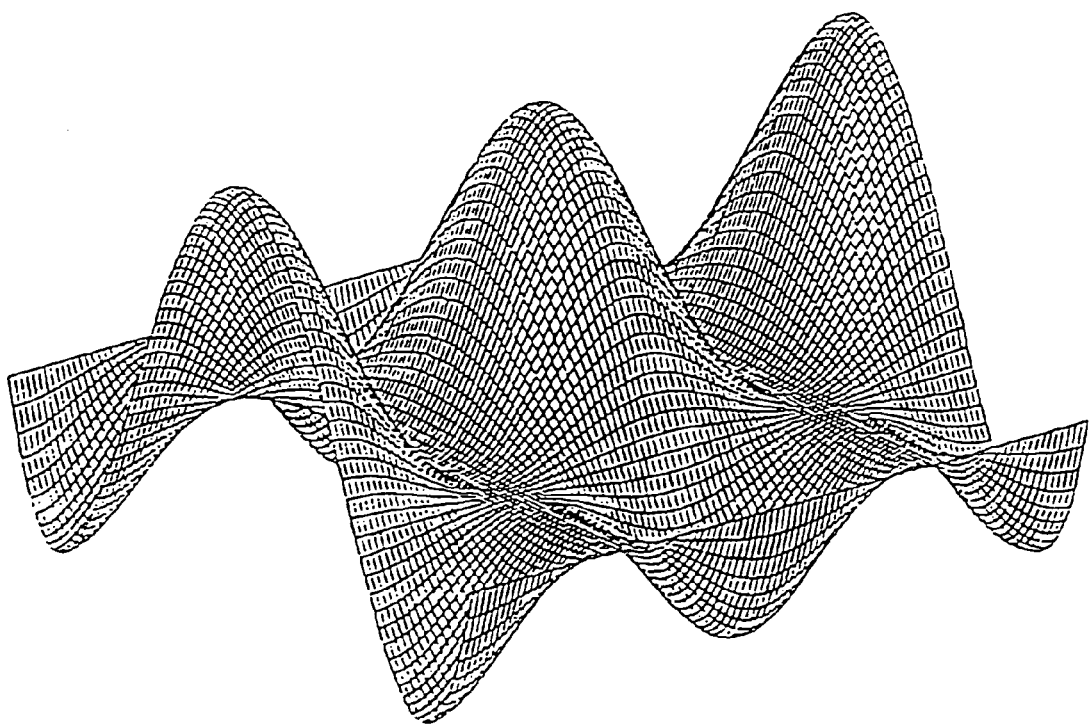
FIG. 7 shows a sample distortion grid.

If the following values are passed to the equation via the DDC data then the distortion grid in FIG. 7 is produced $rx=ry=50$ $dx=dy=0.1$.

In terms of DDC data the following would be transmitted

<Flag 11><50, 50, 0.1, 0.1>.

Additionally, these parameters may be stored in memory within the decoder in the form of a library and recalled by sending the library index within the DDC data.

In terms of DDC data the following would be transmitted:

<Flag 12><library index>.

A further example of the use of Flag 9, motion parallax, will be considered. Prior art has shown that a 2D image that has movement in a horizontal direction may be converted into 3D by the use of motion parallax. It is desirable that the image motion is due to horizontal movement of the camera, i.e., a camera pan. In this technique, one of the viewer's eyes receives the current video field whilst the other eye receives a previous field, i.e., there is a delay between the images presented to each eye. The choice as to which eye receives the delayed image, and the amount of delay, is dependent upon the direction and speed of horizontal motion in the 2D image. The delay would typically be in the range 1 to 4 fields. The choice of direction and delay can be made by considering an overall motion vector within the 2D image and selecting these parameters based upon the size, direction and stability of the vector. In the prior art, it has been necessary to perform these calculations in realtime at the viewing location requiring substantial processing capabilities. It has been found that a preferred method is to calculate the motion vectors, and hence the direction and amount of field delay, at the transmission location and then transmit these values as part of the video signal. Thus, in a preferred embodiment the transmitted data would be as follows:

<Flag9><direction and delay> where <direction and delay> would typically be in the range −4 to +4.

The DDC decoder could then recover this data and use it to insert the correct amount and direction of field delay into the processed images.

The distortion mesh may also be obtained in realtime by the addition of a camera to an existing 2D video or film camera, which, using a variable focus lens and a sharpness detecting algorithm, determines the depth of objects in the image being viewed by the camera. Object depth may be obtained from a stereo pair of cameras whereby correlation between pixels in each image indicates object depth. The output from these configurations, before processing to provide distortion mesh data, may be used to generate depth maps. This is achieved by processing the original 2D image and applying shading, or other indications, to indicate object depth as explained in this disclosure. The outline of each object may be obtained from object characteristics such as object size, color, speed of motion, shading, texture, brightness, obscuration as well as differences between previous and current and future images. Neural networks and expert systems may also be used to assist with identifying objects. It is also proposed to shift the image within the camera so that a physical offset of subsequent images on the cameras image sensor are obtained. This shift may be produced optically, electro-optically, mechanically, electro-mechanically, electronically or other methods known to those skilled in the art. The shift may be in a single direction, i.e., x or multiple directions either sequentially or randomly. The shift of objects on the cameras sensor will be greater for those objects that are closer to the camera. By correlating the pixels in successive images, the depth of each object may be determined. Alternatively a plurality of cameras could be used.

Other techniques may be used to determine the depth of objects within a scene. These include, but are not limited to, the use of range finders operating on optical, laser, ultrasonic or microwave principles or the projection of grids over objects within the scene and determining the depth of an object from the resulting distortion of the grids.

A number of Computer Aided Drawing (CAD) software packages enable wire frame models of the images being drawn to be produced. These wire frame models, which are a projection of the facets of the object, can be used to determine the position of objects within a scene.

Similarly, part of the rendering process of 3D non stereoscopic images from packages like 3D Studio allows the distance from the camera to each pixel to be output. This render can produce a grayscale image which has the closest object appearing white, and the furthest point from the camera appearing black. This grayscale map may be used as a compatible depth map for conversion into stereoscopic 3D.

The claims defining the invention are as follows:

1. A method of encoding a depth map comprising:
    allocating an object identifier to a plurality of objects without using distance measurement data;
    defining an outline of each object;
    allocating a depth tag to each said object including
        allocating a depth function including a linear ramp or radial ramp, and
        allocating a depth for each object, the depth representing the relative depth between said objects; and
    producing a depth map by encoding said depth tag and said outlines of each said object,
    wherein the depth map is configured to be decoded to generate a distortion grid, the distortion grid being used to generate stereoscopic 3D images, and
    wherein the steps of allocating the object identifier, allocating the depth tag and defining the outline are performed by a computer or by receiving an input via a pointing device.

2. A method of encoding a depth map comprising:
    allocating object identifiers to a plurality of objects;
    defining an outline of each object;
    allocating a depth tag to each said object; and
    producing a depth map by encoding said depth tag and said outline of each said object,
    wherein said allocating the depth tag includes:
        allocating a depth function including a linear ramp or radial ramp; and
        allocating a depth for each object, said depth representing the depth between said objects,
    wherein the depth map is configured to be decoded to generate a distortion grid, the distortion grid being used to generate stereoscopic 3D images, and
    wherein the steps of allocating the object identifier, allocating the depth tag and defining the outline are performed by a computer or by receiving an input via a pointing device.

3. The method as claimed in claim 1 or 2 wherein the object outline is defined by a series of co-ordinates, curves and/or geometric shapes.

4. The method as claimed in claim 1 or 2, wherein the depth tag includes a color code.

5. The method as claimed in claim 1 or 2, wherein said depth tag is a numerical value.

6. The method as claimed in claim 5, wherein said numerical value ranges from 0 to 255.

7. The method as claimed in claim 1 or 2 further including adding a texture bump map to the at least one object.

8. The method as claimed in claim 7, wherein said texture bump map is defined by breaking the at least one object into a plurality of components and assigning each component a separate depth tag.

9. The method as claimed in claim 7, wherein said texture bump map is defined by luminance values of individual components of the at least one object.

10. The method as claimed in claim 7, wherein said texture bump map is defined by chrominance, saturation, color grouping, reflections, shadows, focus and/or sharpness of individual components of the at least one object.

11. The method as claimed in claim 1, wherein said object outline is defined by a series of x,y coordinates, each x,y coordinate being separated by a curve.

12. The method as claimed in claim 11, wherein each said curve is stored in a library and allocated a unique number.

13. The method as claimed in claim 11 or claim 12, wherein said object outline also includes data on the orientation of each curve.

14. The method as claimed in claim 11 or claim 12, wherein each said curve is a bezier curve.

15. The method as claimed in claim 1, wherein said object outline is defined by at least one geometric shape.

16. The method as claimed in claim 15, wherein said at least one geometric shape is defined by the form of the shape and the parameters of the shape.

17. A method of converting 2D images into stereoscopic images applying an encoded depth map generated according to the method of claim 1.

18. A method of converting 2D images into stereoscopic images applying a depth map generated according to the method of claim 2.

* * * * *

UNITED STATES PATENT AND TRADEMARK OFFICE
CERTIFICATE OF CORRECTION

PATENT NO. : 7,894,633 B1  Page 1 of 1
APPLICATION NO. : 09/586869
DATED : February 22, 2011
INVENTOR(S) : Philip Victor Harman It is certified that error appears in the above-identified patent and that said Letters Patent is hereby corrected as shown below:

In Column 16, Claim 1, Line 10:
Please replace "the relative depth" with --the depth--

Signed and Sealed this
Fifteenth Day of November, 2011

David J. Kappos
*Director of the United States Patent and Trademark Office*